United States Patent
Okada

(10) Patent No.: US 9,250,335 B2
(45) Date of Patent: Feb. 2, 2016

(54) RADIOGRAPHIC IMAGING DEVICE, RADIOGRAPHIC IMAGING SYSTEM, COMPUTER READABLE MEDIUM STORING DISCONNECTION DETECTION PROGRAM, AND DISCONNECTION DETECTION METHOD

(75) Inventor: Yoshihiro Okada, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 462 days.

(21) Appl. No.: 13/484,281

(22) Filed: May 31, 2012

(65) Prior Publication Data

US 2013/0003926 A1 Jan. 3, 2013

(30) Foreign Application Priority Data

Jun. 30, 2011 (JP) .................................. 2011-146444

(51) Int. Cl.
*G01T 1/29* (2006.01)

(52) U.S. Cl.
CPC .............. *G01T 1/2928* (2013.01); *G01T 1/2914* (2013.01); *G01T 1/2921* (2013.01)

(58) Field of Classification Search
CPC ... G01T 1/2928; G01T 1/2914; G01T 1/2921; H04N 5/00
USPC ............... 250/208.1, 214 R, 290–292, 214.1; 257/440; 348/292–311; 378/62
See application file for complete search history.

(56) References Cited

U.S. PATENT DOCUMENTS

| | | | | |
|---|---|---|---|---|
| 4,694,150 | A * | 9/1987 | Schulz-Hennig et al. | 250/208.1 |
| 5,432,335 | A * | 7/1995 | West et al. | 250/208.2 |
| 7,944,494 | B2 * | 5/2011 | Oda et al. | 348/311 |
| 7,961,237 | B2 * | 6/2011 | Hatano et al. | 348/300 |
| 2003/0178590 | A1 * | 9/2003 | Yasuda et al. | 250/587 |
| 2006/0203112 | A1 * | 9/2006 | Aoki | 348/294 |
| 2007/0229687 | A1 * | 10/2007 | Hiyama et al. | 348/294 |
| 2008/0112016 | A1 * | 5/2008 | Kume | 358/408 |
| 2008/0136743 | A1 * | 6/2008 | Okada | 345/55 |
| 2008/0180588 | A1 * | 7/2008 | Ando | 349/37 |
| 2009/0310003 | A1 * | 12/2009 | Collins | 348/308 |
| 2011/0064195 | A1 * | 3/2011 | Kyushima et al. | 378/62 |
| 2013/0015327 | A1 * | 1/2013 | Amitani | 250/208.1 |

FOREIGN PATENT DOCUMENTS

| | | | |
|---|---|---|---|
| JP | 2009-253668 A | 10/2009 | |
| JP | 2010-74644 A | 4/2010 | |

* cited by examiner

*Primary Examiner* — Nicole Ippolito
*Assistant Examiner* — Sean Luck
(74) *Attorney, Agent, or Firm* — SOLARIS Intellectual Property Group, PLLC

(57) ABSTRACT

The present invention provides a radiographic imaging device, a radiographic imaging system, a computer readable medium storing disconnection detection program and a disconnection detection method that may detect disconnected specific signal lines even when the charge amount output from a single pixel is small. Namely, a bias voltage is applied to pixels, and offset charges due to leak current of sensor portions (photodiodes) are accumulated. The gates of pixel TFT switches are switched ON in sequence, and electric signals are output corresponding to the accumulated offset charges. A control section detects a cumulative value of the offset charge amount based on the electric signals. The detected cumulative value is then compared to a predetermined disconnection detection threshold value and disconnected signal lines are detected when the cumulative value is less than the threshold value.

9 Claims, 12 Drawing Sheets

RADIOGRAPHIC IMAGING DEVICE, RADIOGRAPHIC IMAGING SYSTEM, COMPUTER READABLE MEDIUM STORING DISCONNECTION DETECTION PROGRAM, AND DISCONNECTION DETECTION METHOD

CROSS-REFERENCE TO RELATED APPLICATION

This application claims priority under 35 USC 119 from Japanese Patent Application No. 2011-146444, filed on Jun. 30, 2011 the disclosure of which is incorporated by reference herein.

BACKGROUND OF THE INVENTION

1. Field of the Invention

The present invention relates to a radiographic imaging device, a radiographic imaging system, a computer readable medium storing a disconnection detection program, and a disconnection detection method. The present invention in particular relates to a radiographic imaging device, a radiographic imaging system, a computer readable medium storing a disconnection detection program, and a disconnection detection method for imaging a radiographic image in medical purposes.

2. Description of the Related Art

Radiographic imaging devices are known that perform imaging of radiographic images for medical diagnostic purposes. In such radiographic imaging devices, radiation that has been irradiated from a radiation irradiation device and has passed through an investigation subject is detected, and a radiographic image is imaged. Imaging of radiographic images is performed in such a radiographic imaging device, by collecting and reading charges generated according to the irradiated radiation.

A known such radiographic imaging device is provided with sensor sections, configured by, for example, photoelectric conversion elements, switching elements, and detection sections. The sensor section generates charges when either with irradiated radiation, or with illuminated light that has been converted from radiation. The switching element reads the charges that have been generated in the sensor section. The detection section detects the start of irradiation of radiation (that radiographic imaging has started) based on the charges read by the switching element.

In such a radiographic imaging device, when defects occur in the radiation detection element, a case in which radiographic images not accurately acquired occurs. Accordingly, conventional technology is known for detecting defects in radiographic imaging devices. For example, in Japanese Patent Application Laid-Open (JP-A) No. 2009-253668, technology is described for detecting and rectifying image defects, using first image data imaged in a state in which an investigation subject is not present, and second image data imaged in an state in which the investigation subject is present.

Further, in JP-A No. 2010-74644, technology in the field of radiographic imaging is described for determining whether or not defective pixels are present in a radiation detection element. In this technology, the determination is made based on dark read values corresponding to electric signals arising from extracting charges that have been built up in the radiation detection element when not being irradiated with radiation and outputting from an analogue multiplexer.

In the technology of JP-A No. 2009-253668, it is necessary to acquire radiographic images imaged by irradiating the radiographic imaging device with radiation. In particular, in detection of disconnected signal lines that give line defects in radiographic images, when radiation is not irradiated, difference data (contrast) between disconnected signal lines and non-disconnected signal lines that are small, and there are cases in which detection is difficult.

In the technology of JP-A No. 2010-74644, there are cases in which appropriate detection of disconnections is not possible, when the dark read values are small.

SUMMARY OF THE INVENTION

The present invention provides a radiographic imaging device, a radiographic imaging system, a computer readable medium storing a disconnection detection program, and a disconnection detection method that may detect a disconnection in a specific signal line, even when the charge amount output from a single pixel is small.

A first aspect of the present invention is a radiographic imaging device including: plural radiation detection elements that output electric signals according to charges generated due to irradiation of radiation; plural radiographic imaging pixels, each including, a sensor portion that accumulates charges generated due to irradiation of the radiation, and a switching element that, based on an imaging control signal output from an imaging control signal line, reads out the charges from the sensor portions and outputs electric signals corresponding to the charges; plural specific signal lines connected to the plural radiation detection elements and to the plural radiographic imaging pixels; plural charge amount detection sections, each provided for one of the plural specific signal lines, which detect, corresponding to a number of the radiographic imaging pixels, a cumulative value of the charge amount accumulated in the sensor portions, based on electric signals that have been output from the plural the radiographic imaging pixels; and a disconnection detection section that detects disconnection in the specific signal lines based on a comparison result from comparing the cumulative value detected by the charge amount detection section with a predetermined value.

Plural of the radiographic imaging pixels each including the radiation detection element and the switching element, are each connected the respective plural specific signal lines. The radiation detection element outputs electric signals corresponding to the charges generated due to irradiation of radiation. The switching section reads the charges from the sensor portions, and outputs electric signals corresponding to the charges based on an imaging control signal that has been output from the control signal line.

When the specific signal line is disconnected, it is not possible to read the generated charges from the radiation detection element or the radiographic imaging pixels connected to the specific signal line.

In the first aspect, the charge amount detection sections are provided to each one of the plural specific signal lines. The charge amount detection sections detect the cumulative value of the charge amount, corresponding to the number of the radiographic imaging pixels, accumulated in the respective sensor portions of the radiographic imaging pixels, based on the electric signals that have been output from the plural radiographic imaging pixels connected to the respective specific signal lines. The disconnection detection section detects the disconnected specific signal lines based on a comparison result from comparing the charge amount detected by the charge amount detection section to the predetermined charge amount.

In the first aspect of the present invention, each charge amount detection section is provided to one of the specific signal line, and disconnected specific signal lines are detected based on the charge amount detected by each of the charge amount detection sections. Accordingly, the first aspect of the present invention may detect a disconnected specific signal line, even when the charge amount output from a single pixel is small. Further, the first aspect of the present invention may detect which plural specific signal lines are disconnected.

In a second aspect of the present invention, in the above aspect, the radiation detection element may be a pixel in which the switching element is shorted.

In a third aspect of the present invention, in the first aspect, may further include a detection element control signal line that outputs, to the radiation detection element, a radiation detection control signal to control output of electric signals from the radiation detection element.

In a fourth aspect of the present invention, in the above aspects, may further include: a detection section that detects a start of irradiation of the radiation based on the electric signals output from the radiation detection element; and a control section that controls the detection section to detect the start of irradiation of the radiation based on electric signals that have been output from the radiation detection element to the specific signal lines that are not detected to be disconnected by the disconnection detection section.

Accordingly, the above aspects of the present invention may raise the precision of the detection of the start of irradiation of radiation, by not using radiation detection elements that are connected to specific signal lines that have been detected to be disconnected, for detecting the start of irradiation of radiation.

In a fifth aspect of the present invention, in the above aspects, the charge amount detection section may detect the cumulative value based on electric signals output corresponding to charges that have been accumulated in the sensor portion of the radiographic imaging pixels, in a case in which the radiation is not being irradiated.

In a sixth aspect of the present invention, in the above aspects, may further include a storage section for storing a detection result of the disconnection detection section.

In a seventh aspect of the present invention, in the above aspects, may further include a warning section that warns the number of the specific signal lines that have been detected as disconnected by the disconnection detection section, warns that disconnections have reached a predetermined number or greater when the number of the specific signal lines that have been detected as disconnected by the disconnection detection section is the predetermined number of lines or greater, or combination thereof.

An eighth aspect of the present invention is a radiographic imaging system including an irradiation device for irradiating radiation, and the radiographic imaging device of any one of the first aspect to the seventh aspect for detecting the radiation irradiated from the irradiation device and acquiring a radiographic image corresponding to the detected radiation.

A ninth aspect of the present invention is a computer-readable medium storing a disconnection detection program that causes a computer to execute a process for detecting a disconnection in a radiographic imaging device that includes, a plurality of radiation detection elements that output electric signals according to charges generated due to irradiation of radiation, a plurality of radiographic imaging pixels, each including a sensor portion that accumulates charges generated due to irradiation of the radiation, and a switching element that, based on an imaging control signal output from an imaging control signal line, reads out the charges from the sensor portions and outputs electric signals corresponding to the charges, a plurality of specific signal lines connected to the plurality of radiation detection elements and to the plurality of radiographic imaging pixels, the process including: detecting, corresponding to a number of the radiographic imaging pixels, a cumulative value of the charge amount accumulated in the sensor portions, based on electric signals that have been output from the plurality of the radiographic imaging pixels; and detecting disconnections in the specific signal lines based on a comparison result by comparing the detected cumulative value with a predetermined value.

A tenth aspect of the present invention is a method for detecting a disconnection in a radiographic imaging device that includes, a plurality of radiation detection elements that output electric signals according to charges generated due to irradiation of radiation, a plurality of radiographic imaging pixels, each including a sensor portion that accumulates charges generated due to irradiation of the radiation, and a switching element that, based on an imaging control signal output from an imaging control signal line, reads out the charges from the sensor portions and outputs electric signals corresponding to the charges, a plurality of specific signal lines connected to the plurality of radiation detection elements and to the plurality of radiographic imaging pixels, the method including: detecting, corresponding to a number of the radiographic imaging pixels, a cumulative value of the charge amount accumulated in the sensor portions, based on electric signals that have been output from the plurality of the radiographic imaging pixels; and detecting disconnections in the specific signal lines based on a comparison result by comparing the detected cumulative value with a predetermined value.

According to the above aspects, the present invention may detect a disconnected specific signal line, even when the charge amount output from a single pixel is small.

BRIEF DESCRIPTION OF THE DRAWINGS

Exemplary embodiments of the present invention will be described in detail based on the following figures, wherein.

DETAILED DESCRIPTION OF THE INVENTION

Detailed explanation follows regarding exemplary embodiments of the present invention, with reference to the drawings.

Figure 1:
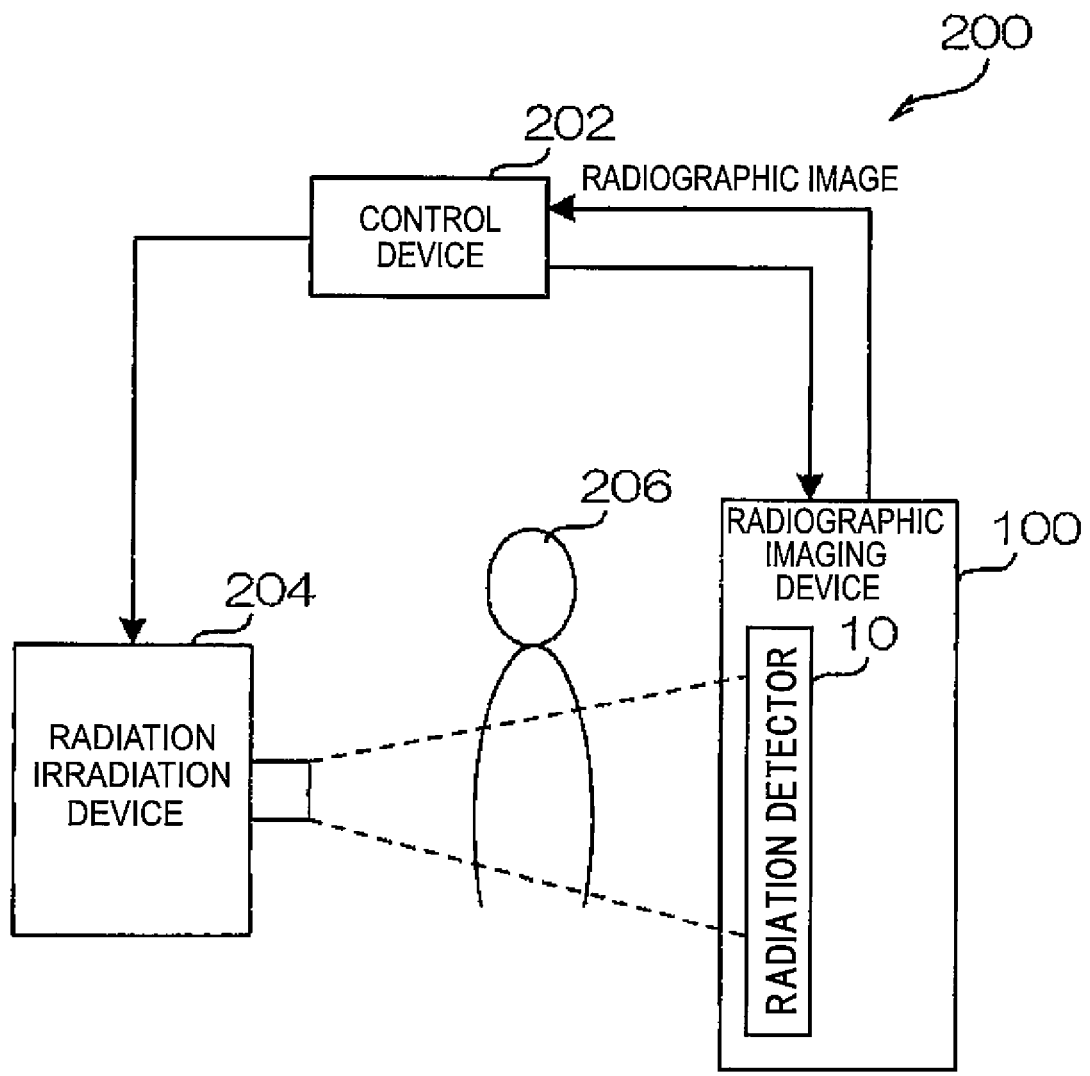
FIG. 1 is a diagram illustrating a schematic configuration of a radiographic imaging system according to the present exemplary embodiment.

Explanation first follows regarding a schematic configuration of a radiographic imaging system of the present exemplary embodiment in which a radiographic imaging device is employed. FIG. 1 is schematic diagram of an example of a radiographic imaging system of the present exemplary embodiment.

A radiographic imaging system 200 according to the present exemplary embodiment includes a radiation irradiation device 204, a radiographic imaging device 100 including a radiation detector 10, and a control device 202. The radiation irradiation device 204 irradiates radiation (for example X-rays) onto an imaging subject 206. The radiation detector 10 detects radiation that was irradiated from the radiation irradiation device 204 and has passed through the imaging subject 206. The control device 202 instructs imaging of a radiographic image, and acquires image data from the radiographic imaging device 100. Radiation irradiated from the radiation irradiation device 204 according to timing controlled by the control device 202 is irradiated onto the radiographic imaging device 100. The radiation irradiated onto the radiographic imaging device 100 carries image data due to passing through the imaging subject 206 positioned in an imaging position.

Explanation now follows regarding a schematic configuration of the radiographic imaging device 100 according to the present exemplary embodiment. Hereinafter, a case in which the present invention is applied to an indirect-conversion-type radiation detector 10, in which the radiation such as X-rays is first converted into light, and then the converted light is converted into charges, is described. In the present exemplary embodiment, the radiographic imaging device 100 is configured including the indirect-conversion-type radiation detector 10. Note that a scintillator employed for converting radiation into light is omitted in FIG. 2.

The radiation detector 10 is configured with plural pixels 20 arrayed in a matrix. Each of the pixels 20 is configured including a sensor portion 103 and a TFT switch 4 serving as a switching element. The sensor portions 103 receive light and generate charges, and accumulate the generated charges. The TFT switches 4 are switching elements for reading out charges accumulated in the sensor portions 103. In the present exemplary embodiment, the sensor portions 103 generate charges due to illumination of light that has been converted by the scintillator.

Figure 2:
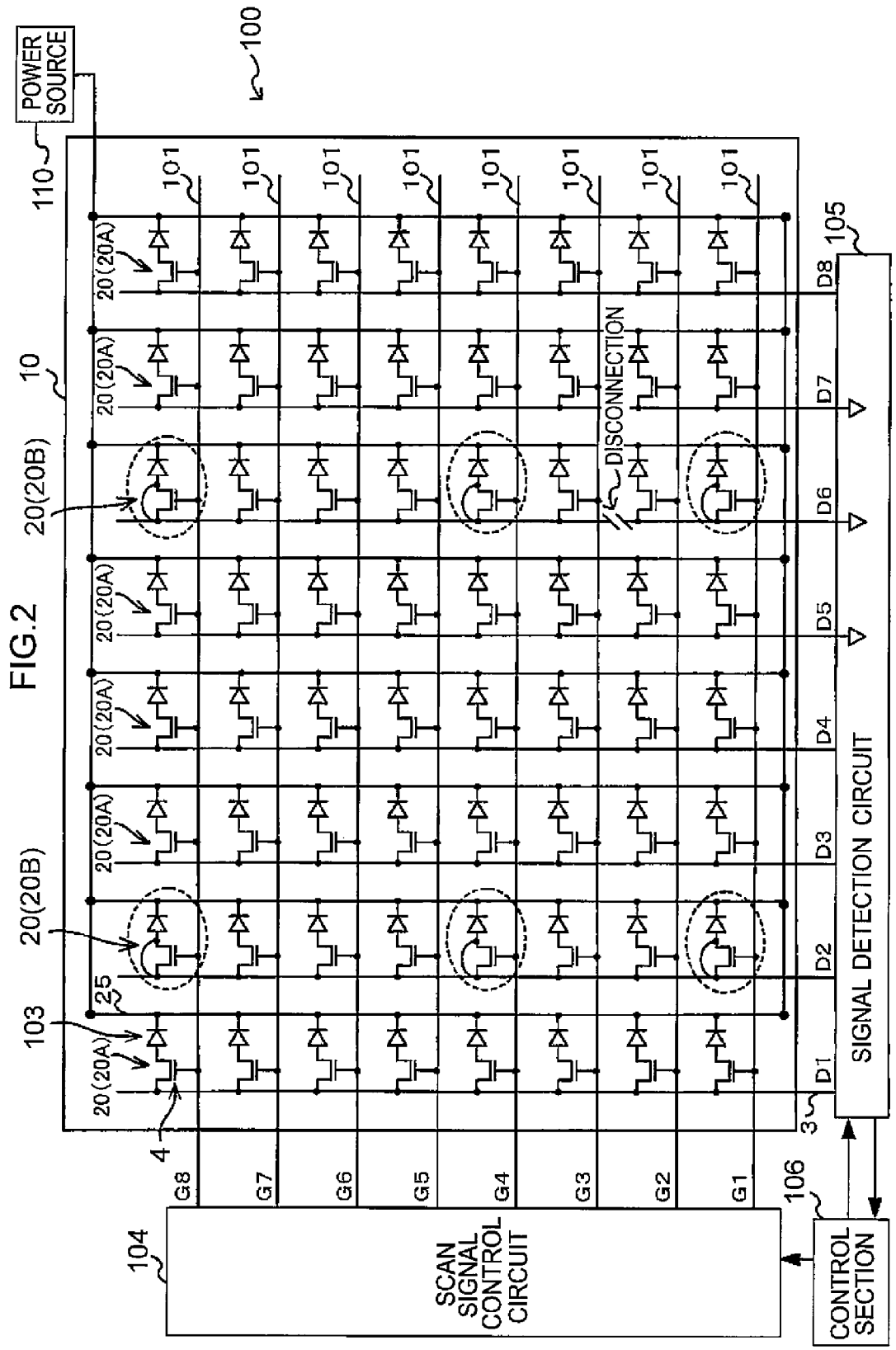
FIG. 2 is a diagram illustrating the overall configuration of a radiographic imaging device according to the present exemplary embodiment.

Plural of the pixels 20 are disposed in a matrix along a first direction (the direction of scan lines 101 in FIG. 2: the across direction in FIG. 2) and a direction intersecting with the scan line direction (the direction of the signal lines 3 in FIG. 2: the vertical direction in FIG. 2). Note that the array of the pixels 20 is simplified in the illustration of FIG. 2. In reality, there are for example 1024×1024 individual pixels 20 disposed along the scan line direction and signal line direction.

In the present exemplary embodiment the plural pixels 20 are predetermined either as pixels 20A (radiographic imaging pixels) for radiographic imaging, or pixels 20B (radiation detection pixels) for radiation detection. Note that the radiation detection pixels 20B in FIG. 2 are encircled with intermittent lines. The radiographic imaging pixels 20A are employed to detect radiation and generate an image expressing the detected radiation. The radiation detection pixels 20B are pixels employed to detect radiation, and are pixels that output charges even during charge accumulation periods.

Plural scan lines 101 and plural signal lines 3 are disposed in the radiation detector 10 on a substrate 1 (see FIG. 3) so as to intersect with each other. The scan lines 101 are switched ON or OFF by the TFT switches 4. The signal lines 3 read charges accumulated in the sensor portions 103. In the present exemplary embodiment, there is a single signal line 3 provided for each pixel line in the one direction, and a single scan line 101 is provided for each pixel line in the intersecting the one direction. For example, there are 1024 lines provided for the signal lines 3 and the scan lines 101 respectively in a case where there are 1024×1024 individual pixels 20 disposed in the scan line direction and the signal line direction.

In the radiation detector 10, common electrode lines 25 are provided parallel to each of the signal lines 3. The common electrode lines 25 are connected together in parallel at a one end and an other end thereof. A power source 110 is connected to the one end of the common electrode lines 25 for applying a specific bias voltage thereto. The sensor portions 103 are connected to the common electrode lines 25 and are applied with a bias voltage through the common electrode lines 25.

Control signals for switching each of the TFT switches 4 flow in the scan lines 101. Each of the TFT switches 4 are switched by the control signals flowing in each of the scan lines 101.

Electric signals corresponding to charges that have accumulated in each of the pixels 20 flow in each of the signal lines 3 depending on the switching state of the TFT switches 4 of each of the pixels 20. More specifically, switching ON the TFT switch 4 of any pixel 20 connected to a given signal line 3 results in electric signals flowing in the given signal line 3 corresponding to the charges that were accumulated in the pixel 20.

A signal detection circuit 105, which detects the electric signals flowing in the signal lines 3, is connected to the signal lines 3. A scan signal control circuit 104, which outputs control signals for switching the TFT switches 4 ON and OFF to the scan lines 101, is connected to the scan lines 101. FIG. 2 is simplified to show a single signal detection circuit 105 and a single scan signal control circuit 104. However, for example, the signal detection circuit 105 and the scan signal control circuit 104 may be plurally provided and predetermined numbers (for example, 256) of the signal lines 3 and the scan lines 101 may be connected to the respective signal detection circuits 105 and scan signal control circuits 104. For example, if 1024 each of the signal lines 3 and the scan lines 101 are provided, four of the scan signal control circuits 104 may be provided and sets of 256 of the scan lines 101 may be connected thereto, and four of the signal detection circuits 105 may be provided and sets of 256 of the signal lines 3 may be connected thereto.

Each signal detection circuit 105 incorporates an amplification circuit for each signal line 3 (see FIG. 6), which amplifies the inputted electric signals. In the signal detection circuit 105, the electric signals inputted by the signal lines 3 are amplified by the amplification circuits and are converted to digital signals by an analog-to-digital converter (ADC).

A control section 106 is connected to the signal detection circuit 105 and the scan signal control circuit 104. The control section 106 applies predetermined process, such as noise reduction and the like, to the digital signals converted by the signal detection circuit 105. Further, the control section 106 outputs control signals representing signal detection timings to the signal detection circuit 105, and outputs control signals representing scan signal output timings to the scan signal control circuit 104.

The control section 106 of the present exemplary embodiment is configured by a microcomputer, and is provided with a central processing unit (CPU), a ROM, a RAM and a non-volatile memory section configured by flash memory or the like. The control section 106 executes a program stored in the ROM with the CPU, and thus performs control for imaging a radiographic image. The control section 106 applies process to interpolate image data for the radiation detection pixels 20B (interpolation processing) to the image data, to which the above-mentioned predetermined processing has been applied, and generates an image representing the irradiated radiation. Namely, the control section 106 generates the image representing the irradiated radiation by interpolating image data for the radiation detection pixels 20B on the basis of the image data to which the above-mentioned predetermined processing has been applied.

Figure 3:
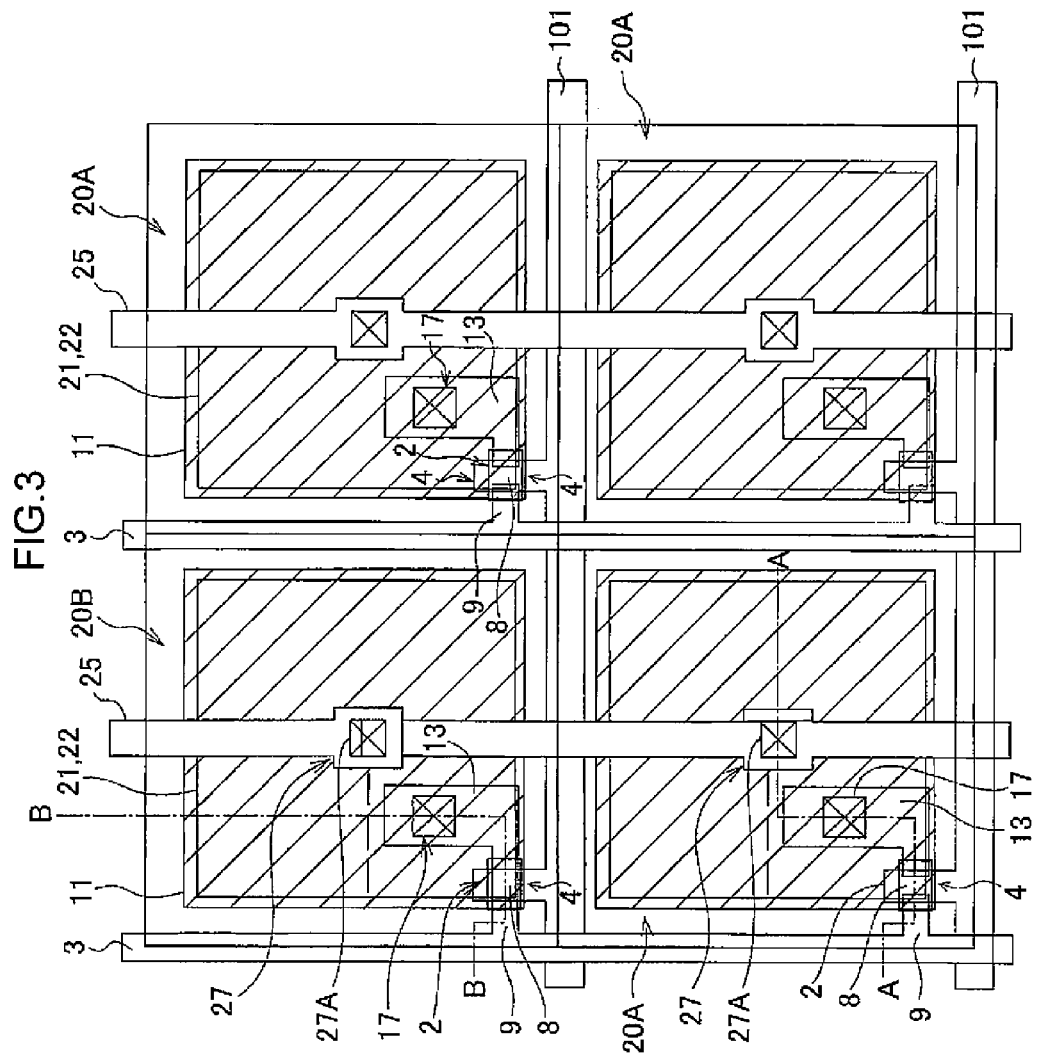
FIG. 3 is a plan view illustrating a configuration of a radiation detector according to the present exemplary embodiment.
Figure 4:
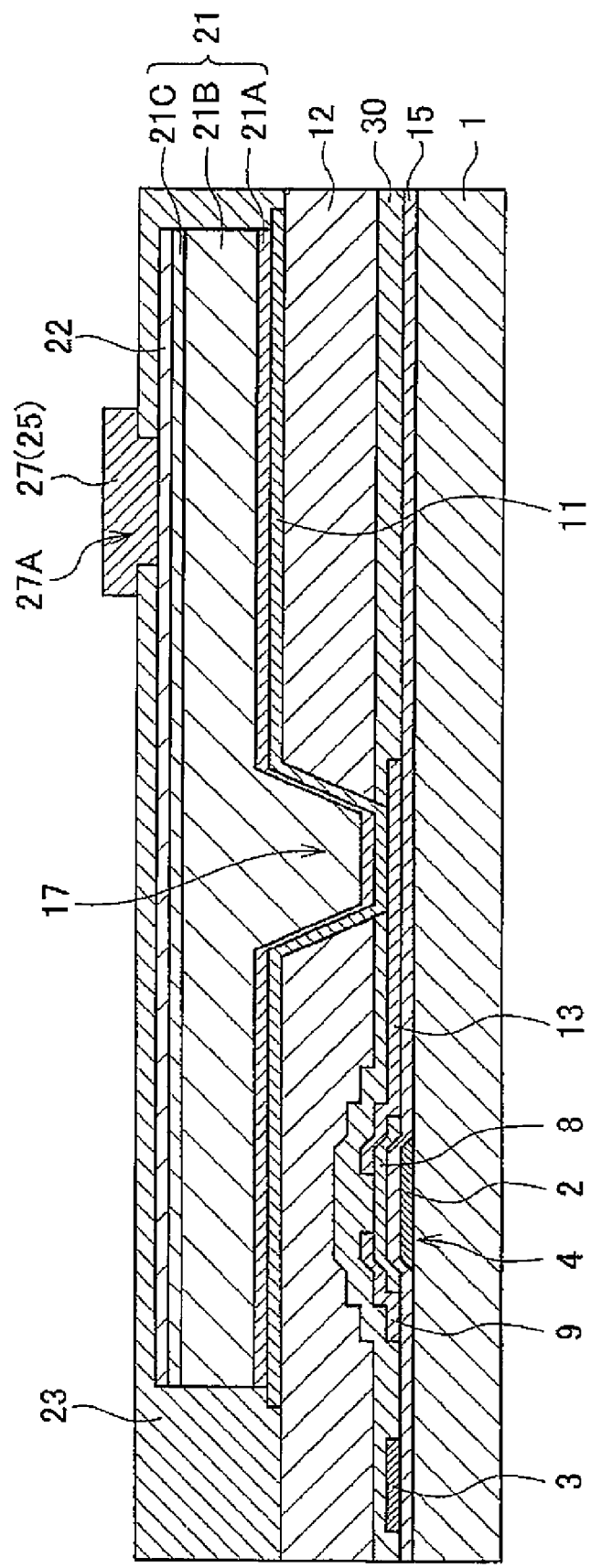
FIG. 4 is a cross-sectional view of a radiation detector according to the present exemplary embodiment.
Figure 5:
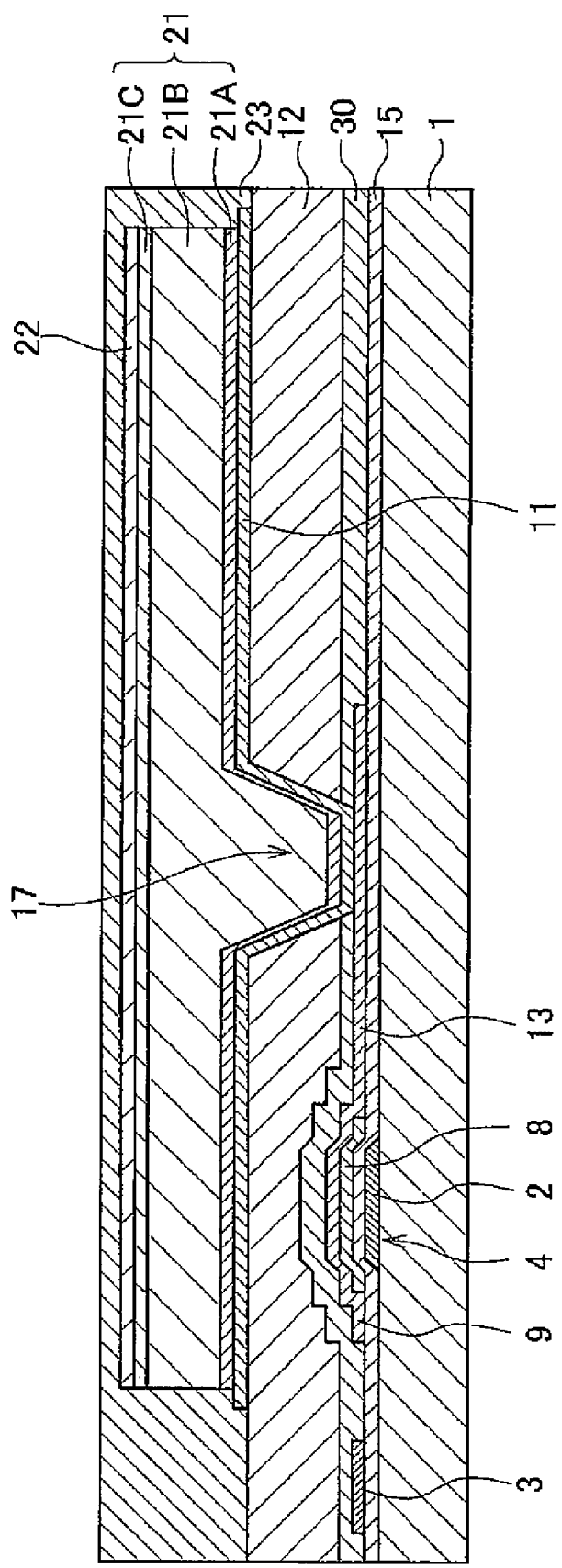
FIG. 5 is a cross-sectional view of a radiation detector according to the present exemplary embodiment.

FIG. 3 shows a plan diagram illustrating configuration of the indirect-conversion-type radiation detector 10, in accordance with the present exemplary embodiment. FIG. 4 shows a cross-sectional diagram of one of the radiographic imaging pixels 20A taken along line A-A in FIG. 3. FIG. 5 shows a cross-sectional diagram of one of the radiation detection pixels 20B taken along line B-B in FIG. 3.

As shown in FIG. 4, each pixel 20A of the radiation detector 10 is configured with a scan line 101 (see FIG. 3) and a gate electrode 2 formed on the insulating substrate 1 of a material such as alkali-free glass. The scan line 101 and the gate electrode 2 are connected together (see FIG. 3). The wiring layer in which the scan line 101 and the gate electrode 2 are formed (this wiring layer is referred to below as the "first signal wiring layer") is formed with Al and/or Cu, or formed employing a layered film with a main component of Al and/or Cu. However the material of the first signal wiring layer is not limited thereto.

An insulation film 15 is formed on one face of the first signal wiring layer. Positions of the insulation film 15 that are disposed above the gate electrode 2 acts as a gate insulation film in the TFT switch 4. The insulation film 15 is formed of, for example, $SiN_x$ or the like, and is formed by for, example, Chemical Vapor Deposition (CVD) film forming.

Semiconductor active layers 8 are formed on the insulating layer 15 as islands over the gate electrodes 2. The semiconductor active layers 8 are channels portions of the TFT switches 4 and include amorphous silicon films, for example.

Source electrodes 9 and drain electrodes 13 are formed in a layer thereabove. The signal lines 3 are also formed in the wiring layer in which the source electrodes 9 and the drain electrodes 13 are formed. The source electrodes 9 are connected to the signal lines 3 (see FIG. 3). The wiring layer in which the source electrodes 9, drain electrodes 13 and signal lines 3 are formed (hereinafter referred to as "the second signal wiring layer") is formed with Al and/or Cu, or formed employing a layered film with a main component of Al and/or Cu. However, the material of the second signal wiring layer is not limited to these. An impurity-doped semiconductor layer (not shown in the drawings), formed of impurity-doped amorphous silicon or the like, is formed between the source electrodes 9 and the semiconductor active layers 8 and between the drain electrodes 13 and the semiconductor active layers 8. According to the above, the TFT switches 4 for switching are configured. In the TFT switches 4, the source electrodes 9 and the drain electrodes 13 may be opposite due to the polarities of the charges that are collected and accumulated by lower electrodes 11.

A TFT protection film layer 30 is formed over substantially the whole area of a region in which the pixels 20 are provided on the substrate 1 (almost the whole region), covering the second wiring layer. The TFT protection film layer 30 is for protecting the TFT switches 4 and the signal lines 3. The TFT protection film layer 30 is formed of, for example, SiNx or the like, and is formed by, for example, CVD film formation.

A coated interlayer insulating film 12 is formed on the TFT protective film layer 30. The interlayer insulating film 12 is formed in a film thickness of 1 μm to 4 μm by a photosensitive organic material (e.g., a positive photosensitive acrylic resin: a material in which a naphthoquinone diazide positive photosensitizer is mixed together with a base polymer comprising a copolymer of methacrylic acid and glycidyl methacrylate) having a low permittivity (relative permittivity $\epsilon r$=2 to 4).

In the radiation detector 10 according to the present exemplary embodiment, the capacitance between metals placed on top of and under the interlayer insulating film 12 is kept low by the interlayer insulating film 12. Further, usually this material also has a function as a planarizing film and also may planarize the steps formed below. In the radiation detector 10 according to the present exemplary embodiment, contact holes 17 are formed in positions in the interlayer insulating film 12 and the TFT protection film layer 30 opposing the drain electrodes 13.

Lower electrodes 11 of the sensor portions 103 are formed on the interlayer insulating film 12 in such a way as to cover the pixel regions while filling in the contact holes 17. The lower electrodes 11 are connected to the drain electrodes 13 of the TFT switches 4. The lower electrodes 11 have virtually no restrictions in their material as long as the material is conductive in a case where later-described semiconductor layers 21 are thick around 1 μm. For this reason, the lower electrodes 11 may be formed using a conductive metal such as an Al material or ITO.

On the other hand, in a case where the film thickness of the semiconductor layers 21 is thin (around 0.2 μm to 0.5 μm), light absorption may not be sufficient in the semiconductor layers 21. For this reason, in order to prevent an increase in leak current resulting from the application of the light to the TFT switches 4, it is preferable for the lower electrodes 11 to be formed using a layered film or an alloy made mainly of a light-blocking metal.

The semiconductor layers 21, which function as photodiodes, are formed on each lower electrode 11. In the present exemplary embodiment, photodiodes with a PIN structure, in which an n+ layer, an i layer, and a p+ layer (n+ amorphous silicon, amorphous silicon, and p+ amorphous silicon) are layered, are employed as the semiconductor layers 21. The semiconductor layers 21 are formed by sequentially layering an n+ layer 21A, an i layer 21B, and a p+ layer 21C from the lower layer. The i layer 21B generates charges (a free electron and free hole pair) as a result of being light being applied to the i layer 21B. The n+ layer 21A and the p+ layer 21C function as contact layers, and electrically connect the i layer 21B to the lower electrode 11 and a later-described upper electrode 22.

Upper electrodes 22 are individually formed on each of the semiconductor layers 21. A material whose light transmittance is high, such as ITO or IZO (indium zinc oxide), for example, is used for the upper electrodes 22. In the radiation detector 10 according to the present exemplary embodiment, the sensor portions 103 are configured to include the upper electrodes 22, the semiconductor layers 21, and the lower electrodes 11.

A coated intermediate insulation film 23 is formed on the intermediate insulation film 12, the semiconductor layers 21 and the upper electrodes 22. The intermediate insulation film 23 has openings 27A each facing a portion of each of the upper electrodes 22, and is formed so as to cover each of the semiconductor layers 21.

The common electrode lines 25 are formed on the interlayer insulating film 23 by Al or Cu or by an alloy or a layered film made mainly of Al or Cu. Contact pads 27 are formed in the neighborhoods of the openings 27A, and the common electrode lines 25 are electrically connected to the upper electrodes 22 via the openings 27A in the interlayer insulating film 23.

On the other hand, in each radiation detection pixel 20B of the radiation detector 10, as shown in FIG. 5, the TFT switch 4 is formed such that the source electrode 9 and the drain electrode 13 are in contact. Namely, in the pixel 20B, the source and drain of the TFT switch 4 are short-circuited. Accordingly, charges collected at the lower electrode 11 of the pixels 20B flow into the signal lines 3 regardless of the switching state of the TFT switches 4.

On the radiation detector 10 that has been formed as described above, a protective film is further formed, if necessary, by an insulating material whose light absorption is low, and a scintillator comprising GOS or the like is adhered on the surface of the protective film using an adhesive resin whose light absorption is low.

Figure 6:
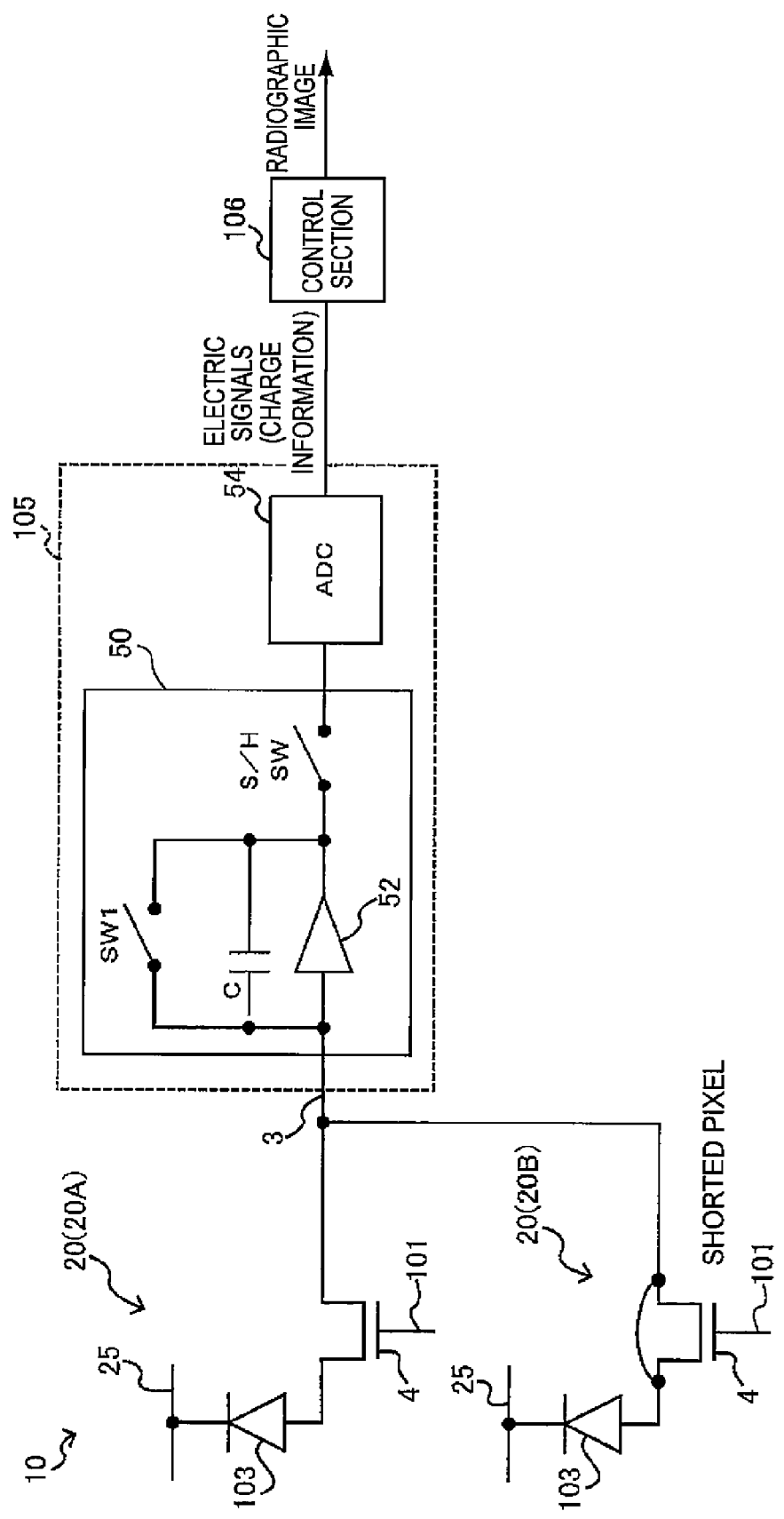
FIG. 6 is a diagram illustrating an outline configuration of a signal detection circuit of a radiographic imaging device according to the present exemplary embodiment.

Next, explanation is given regarding a schematic configuration of the signal detection circuit 105 of the present exemplary embodiment. FIG. 6 is a schematic configuration diagram showing an example of the signal detection circuit 105 of the present exemplary embodiment. The signal detection circuit 105 according to the present exemplary embodiment includes the amplification circuit 50 and an analogue-to-digital converter (ADC) 54. Note that while simplified in the drawing of FIG. 6, one of the amplification circuits 50 is provided for each of the signal lines 3. Namely, the signal detection circuit 105 is provided with the same number of amplification circuits 50 as the number of signal lines 3 of the radiation detector 10.

The amplification circuit 50 is constituted by a charge amplification circuit. The amplification circuit 50 is provided with an amp 52 such as an operational amp or the like, a capacitor C connected in parallel with the amp 52, and a charge reset switch SW1 connected in parallel with the amp 52.

In the amplification circuit 50, when the charge reset switch SW1 is in the OFF state, charges (electric signals) are read out by the TFT switches 4 of the pixels 20. Then, the charges read out by the TFT switches 4 are accumulated at the capacitor C, and a voltage value outputted from the amp 52 in accordance with the accumulated charge amount is amplified.

The control section 106 applies charge reset signals to the charge reset switch SW1 and performs control to switch the charge reset switch SW1 ON and OFF. Note that, in a case in which the charge reset switch SW1 is switched ON, the input side and output side of the amp 52 are shorted together, and charges at the capacitor C are discharged.

The ADC 54 converts electric signals that are analog signals inputted from the amplification circuit 50 to digital signals, in a state in which a sample-hold (S/H) switch SW is switched ON. The ADC 54 serially outputs the electric signals converted to digital signals to the control section 106.

The electric signals outputted from all the amplification circuits 50 provided in the signal detection circuit 105 are inputted to the ADC 54 of the present exemplary embodiment. Namely, the signal detection circuit 105 of the present exemplary embodiment is provided with a single ADC 54 regardless of the number of amplification circuits 50 (and signal lines 3).

In the present exemplary embodiment, electric signals from the signal lines 3 connected to the radiation detection pixels 20B (referred to below as "specific signal lines 3", at least one of the lines labeled D2 and/or D6 in FIG. 2, for example D2) are detected by the amplification circuits 50 of the signal detection circuit 105. The control section 106 then compares the value of the digital signal converted by the signal detection circuit 105 with a predetermined radiation detection threshold value and, determines whether or not radiation has been irradiated, depending on whether the digital signal value is the threshold value or greater. Consequently, the radiographic imaging device 100 according to the present exemplary embodiment does not rely on control signals from the control device 202 for execution, and therefore, is configured to be "synchrony-free". The determination by the control section 106 of whether or not radiation has been irradiated, is not limited to this comparison with a radiation detection threshold value. For example, the control section 106 may detect the irradiation of radiation on the basis of a pre-specified condition, such as a number of detections or the like.

Note that the meaning of the term "detection" of electric signals in the present exemplary embodiment is intended to include sampling of the electric signals.

Figure 7:
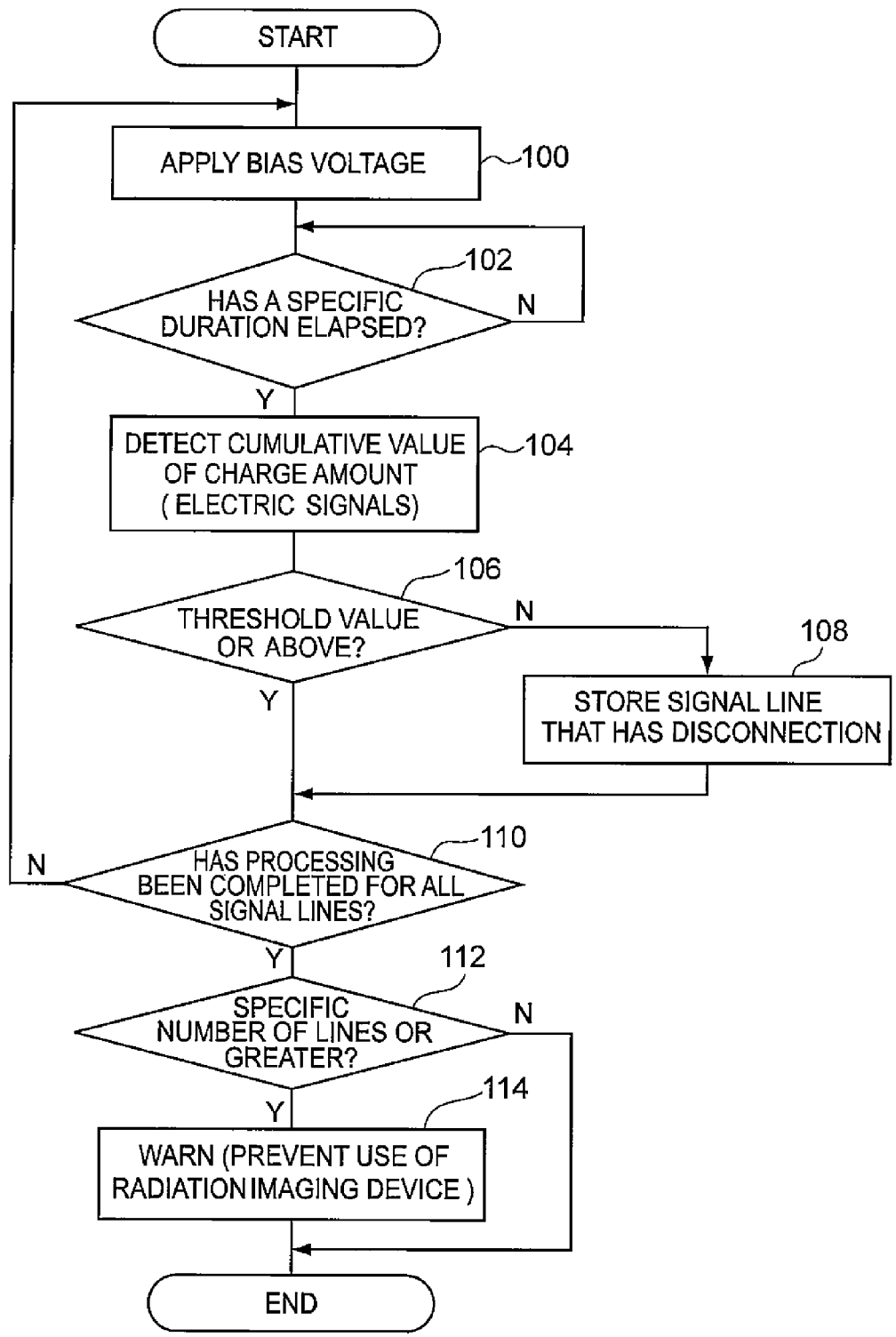
FIG. 7 is a flowchart illustrating an operation to detect the presence of a disconnected specific signal line, executed by a control section of a radiographic imaging device according to the present exemplary embodiment.
Figure 8:
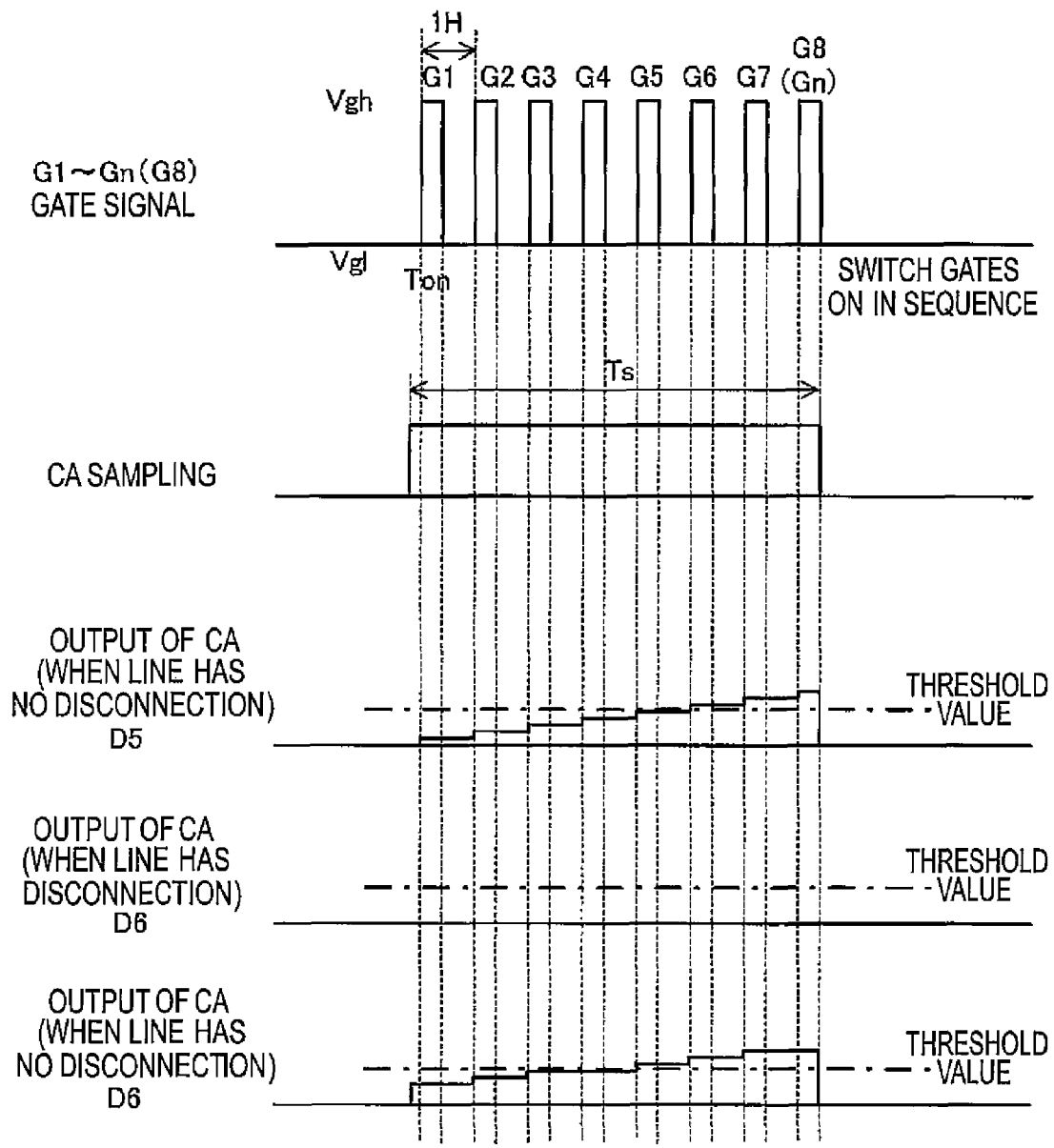
FIG. 8 is a timing chart illustrating a detection operation to detect a cumulative value of the charge amount in a radiographic imaging device according to the present exemplary embodiment.

Explanation follows, with reference to FIG. 7 and FIG. 8, regarding a flow of disconnection detection operation performed to detect whether there is a disconnection in the specific signal lines 3 to which the pixels 20B (lines D2 and D6 in FIG. 2) are connected or in the other signal lines 3 (the lines D1, D3 to D5, D7 and D8 in FIG. 2). In the following, a specific example is explained in which the specific signal line 3 (D6) is disconnected (see FIG. 2). FIG. 7 is a flow chart illustrating an example of a flow of disconnection detection operation executed in the control section 106 of the radiographic imaging device 100 of the present exemplary embodiment. FIG. 8 is a timing chart illustrating an example of flow of a detection operation to detect a cumulative value of the charge amount.

In the present exemplary embodiment, disconnection detection operation is performed in a state in which radiation is not being irradiated onto the radiographic imaging device 100 (for example when power to the radiographic imaging device 100 is switched ON, when power to the radiographic imaging device 100 is switched OFF, or prior to starting irradiation of radiation for radiographic imaging).

The disconnection detection operation illustrated in FIG. 7 is executing, by the CPU, a control program stored, for example, in RAM of the control section 106. Note that the control program may be pre-stored in the control section 106, or may be acquired from outside the control section 106. In the disconnection detection operation, in step S100, a bias voltage is applied from the power source 110 to the pixels 20 through the common electrode lines 25. Then, in step S102, determination is made as to whether or not a specific duration has elapsed (a frame period Tf). When the specific duration has not yet elapsed, a negative determination is made, and is turned to a standby state. However, when the specific duration has elapsed, an affirmative determination is made, and the processing proceeds to step S104.

When the bias voltage is applied, in each of the pixels 20, leak current of the sensor portions (photodiodes) 103 is charged as an offset value. Namely, offset charges are accumulated. Here, when the offset charge amount is denoted as Qo, the photodiode leak current is denoted as Ipd, and the frame period is denoted as Tf, the offset charge amount Qo may be expressed by the following expression (1).

$$Qo=Ipd\times Tf \qquad (1)$$

In step S104, the cumulative value of the offset charge amount Qo accumulated in the pixels 20 is detected (see FIG. 8). First, the S/H switch SW of the respective amplification circuit 50 is turned to an ON state for the duration of the sampling period Ts. Then a control signal of a cycle of 1H is output in sequence to each of the scan lines 101 (lines G1 to Gn, as a specific example in the present exemplary embodiment n=8), so as to sequentially switch each of the TFT switches 4 of each of the pixels 20 into an ON state, and the offset charge (offset charge amount Qo) is read out. However, in the pixels 20B, due to the source and the drain of each of the TFT switches 4 being shorted, the offset charge is read out irrespective of the control signal state of the scan lines 101 (irrespective of whether the control signal line is at Vgh or Vgl).

FIG. 8 illustrates output (the offset charges read from the pixels 20 connected to the signal line 3 (D5)) of the amplifier (charge amplifier CA) 52 of the amplification circuit 50 connected to an un-disconnected signal line 3 (D5). Similarly FIG. 8 also illustrates output of the amplifier 52 of the amplification circuit 50 connected to a disconnected specific signal line 3 (D6). For comparison FIG. 8 also illustrates output of the amplifier 52 of the amplification circuit 50 connected to an un-disconnected specific signal line 3 (D6) for a case when the specific signal line 3 (D6) is not disconnected.

As shown in the output of the amplifier 52 connected to the signal line 3 (D5) (see FIG. 8), the offset charge amount Qo is cumulated (integrated) as each of the gates of the TFT switches 4 of the pixels 20 are tuned to an ON state in sequence one at a time. However, since the specific signal line 3 (D6) is disconnected, the electric signals (offset charges) are not input from the pixels 20 to the respective amplification circuit 50. Hence, as can be seen from the output of the amplifier 52 connected to the disconnected specific signal line 3 (D6), (see FIG. 8) the offset charge amount Qo does not change and remains zero (or a value that can be taken as zero). Note that when the specific signal line 3 (D6) is not disconnected, at first the offset charge amount Qo accumulated in all of the pixels 20 connected to the specific signal line 3 (D6) is output and cumulated, then the gates of the TFT switches 4 of the pixels 20A are turned to ON in sequence and the offset charge amount Qo accumulated in the gates of the pixels 20A is cumulated (see FIG. 8).

Then, in step S106, determination is made as to whether or not the cumulative value of the offset charge amount Qo is equal to or greater than a predetermined threshold value (see FIG. 8). In the present exemplary embodiment, the threshold value is predetermined in consideration of the influence from noise. Non-disconnection determination is made when the cumulative value of the offset charge amount Qo is equal to or greater than the threshold value, and disconnection determination is made when the offset charge amount Qo is less than the threshold value.

When the cumulative value of the offset charge amount Qo is equal to or greater than the threshold value, determination of non-disconnection is made, and therefore an affirmative determination is made, and the process proceeds to step S110. However, when the cumulative value of the offset charge amount Qo is less than the threshold value, determination that there is a disconnection is made, and therefore, a negative determination is made, and the process proceeds to step S108. After storing which of the signal line(s) 3 have been determined to be disconnected in a storage section (for example a storage section provided to the control section 106, not shown in the drawings) the process proceeds to step S110. In the present exemplary embodiment, the specific signal line 3 (D6) is stored in the current process.

In step S110, determination is made as to whether the comparison of the cumulative value of the offset charge amount Qo and the threshold value for all of the signal lines 3 has been made. In the present exemplary embodiment, determination is made as to whether or not processing for the 8 signal lines 3 from signal line 3 (D1) to signal line 3 (D8) has been completed. When there are still any signal lines 3 for which a comparison of cumulative value of offset charge amount Qo and threshold value has not yet been performed, then a negative determination is made, and the process returns to step S100, and the above process is repeated. However, when the comparison has been made for all of the signal lines 3, an affirmative determination is made, and the process proceeds to step S112.

In step S112, determination is made as to whether the number of specific signal lines 3 detected as disconnected is equal to or greater than a specific number of lines. When a given specific signal line 3 is disconnected, the charges generated due to radiation in the radiation detection pixels 20B that are connected to the given specific signal line 3 cannot be detected by the respective amplification circuit 50. Hence, the start of irradiation of radiation may not be appropriately detected. Accordingly, it is not advisable to use the radiographic imaging device 100 (the radiation detector 10) when number of the specific signal lines 3 disconnected is greater than the predetermined specific number. Therefore, when the number of disconnected specific signal lines 3 is greater than the specific number of lines, affirmative determination is made in step S112, and the process proceeds to step S114. In step S114, a warning is given that breakage of the specific signal lines 3 has occurred. Then current process is ended after preventing use of the radiographic imaging device 100. However, when the number of disconnected specific signal lines 3 is less than the specific number of lines, the current process is ended. Note that, the specific number of lines, acting as the basis for determining whether or not to prevent use, may be predetermined according to the specification of the radiographic imaging device 100 and the total number of the specific signal lines 3. There is no limitation regarding the method of warning and, for example, a service call may be output to outside of the radiographic imaging device 100, and/or light may be caused to be output from a light emitting section provided to the radiographic imaging device 100, such as an LED.

As explained above, in the radiographic imaging device 100 of the present exemplary embodiment, a bias voltage is applied to the pixels 20 and offset charges are accumulated according to leak current in the sensor portions (photodiodes) 103 of the pixels 20. Then, the gates of the TFT switches 4 of the pixels 20 are switched ON in sequence, so as to output electric signals corresponding to the accumulated offset charges. The cumulative value of the offset charge amount Qo is detected based on the electric signals, and the control section 106 compares the detected cumulative value with a predetermined disconnection detection threshold value. The signal lines 3 are detected as being disconnected when the cumulative value is less than the threshold value.

Accordingly, in the present exemplary embodiment, due to detecting the cumulative value of the offset charge amounts Qo from each respective pixel 20, and comparing the detected value with the threshold value, the disconnected signal lines 3 can be detected even when there is small (particularly compared to when the radiation is irradiated) individual offset charge amount Qo. Consequently, a break in a given specific signal line 3 can be detected even in cases where there is only a small charge amount output from each of the single pixels 20.

In the present exemplary embodiment, line defects may be prevented from occurring in imaged radiographic images, since disconnected specific signal lines 3 are detected using small offset charge amount Qo. Accordingly, the need for repeating radiographic imaging may be suppressed, thereby also unnecessary radiation dose to the subject may be suppressed.

In the present exemplary embodiment there is no need to irradiate radiation in order to detect disconnections by employing the offset charge amount Qo. Accordingly disconnection direction may be performed automatically, without requiring a user such as a radiologist to irradiate radiation.

In the radiographic imaging device 100 of the present exemplary embodiment, when imaging a radiographic image by irradiated radiation from the radiation irradiation device 204, electric signals (electric signals corresponding to the charge amount) output from the radiation detection pixels 20B connected to the specific signal lines 3 are detected by the amplification circuits 50 of the signal detection circuit 105. The control section 106 then compares the detected electric signals (electric signals corresponding to the charge amount) with a predetermined radiation detection threshold value, so as to detect the start of irradiation of radiation by whether or not detection is the threshold value or greater. When this is performed in the present exemplary embodiment, the pixels 20B connected to the specific signal lines 3 that have been detected as disconnected in the above disconnection detection processing are not employed for detecting the start of irradiation of radiation. Namely, the specific signal lines 3 stored in the storage section that have been detected as being disconnected are excluded, and the electric signals output from the pixels 20B are detected by using the other specific signal lines 3. Accordingly, the radiographic imaging device 100 of the present exemplary embodiment may raise the precision of detecting the start of irradiation of radiation.

In the radiographic imaging device 100 of the present exemplary embodiment, after acquiring a radiographic image, interpolation processing is performed for the pixels 20 that are connected to the signal lines 3 stored in the storage section that have been detected as being disconnected. Accordingly, the radiographic imaging device 100 of the present exemplary embodiment may raise the precision of the imaged radiographic images.

Figure 9:
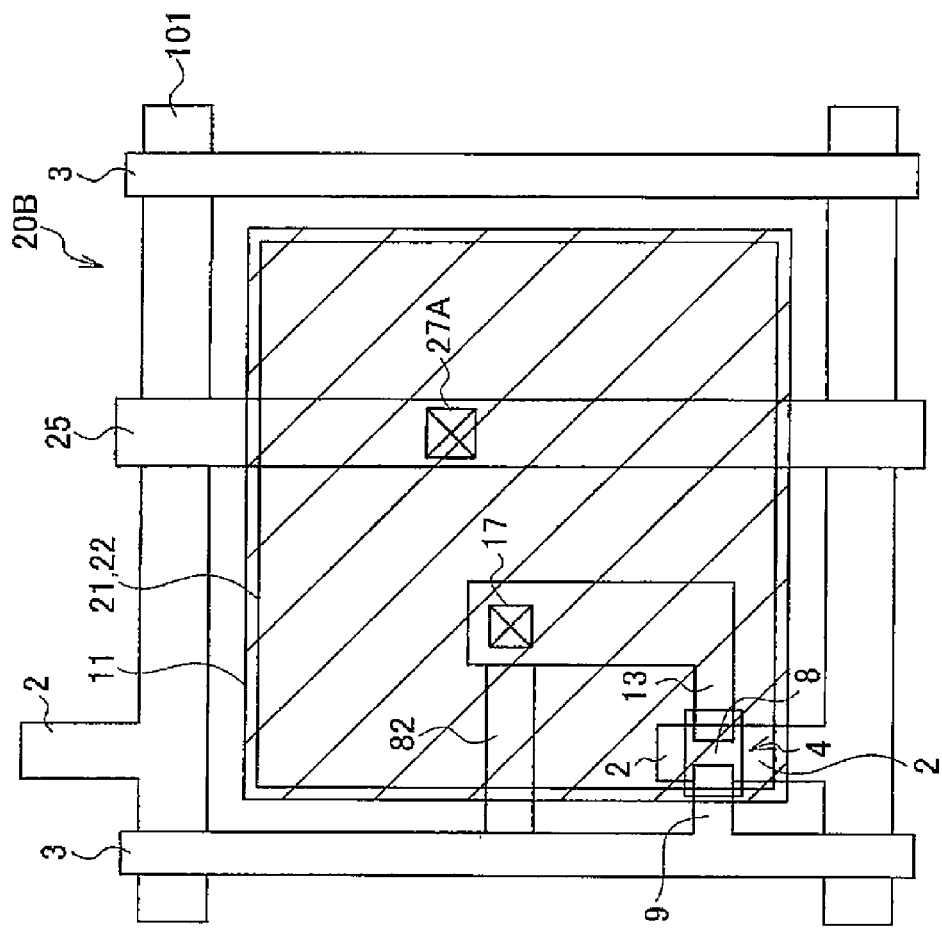
FIG. 9 is a plan view illustrating a configuration of a radiation detector according to an alternative exemplary embodiment.
Figure 10:
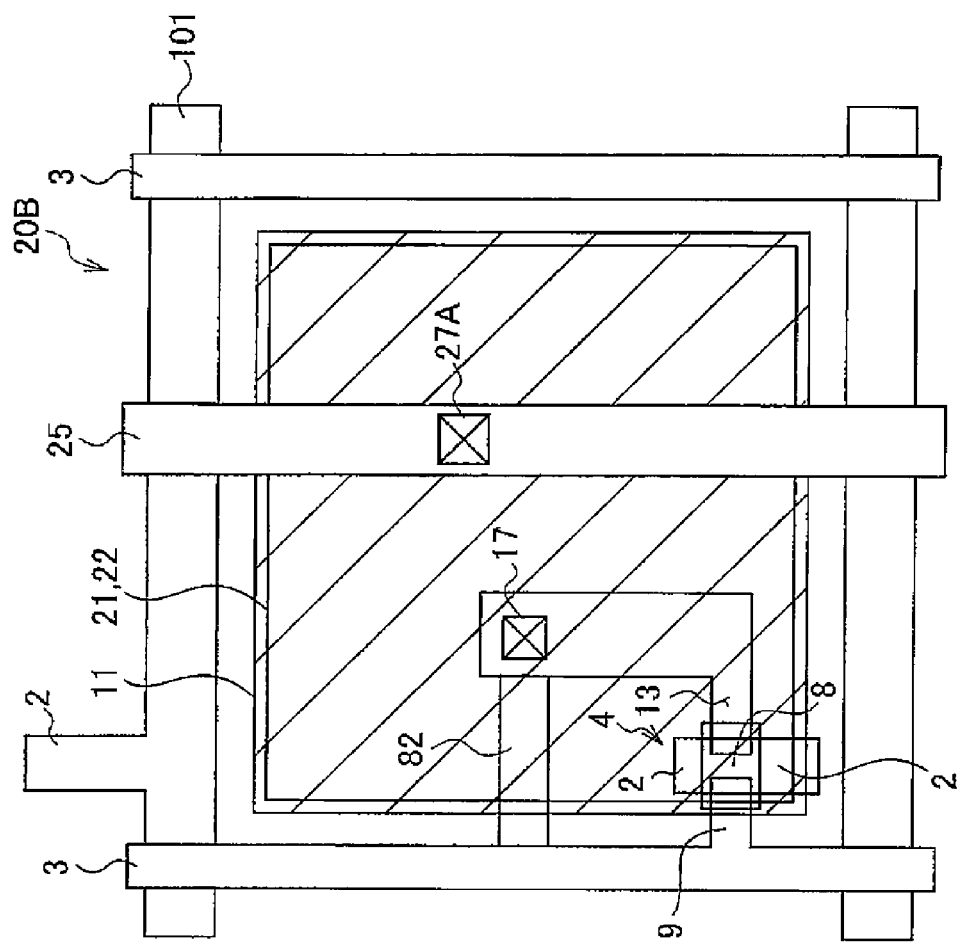
FIG. 10 is a plan view illustrating a configuration of a radiation detector according to an alternative exemplary embodiment.

In the present exemplary embodiment, a case in which the radiation detection pixels 20B equipped with TFT switches 4 with shorted sources and drains are employed in radiation detection, has been described. However, the present invention is not limited thereto. For example, as shown in FIG. 9, connection lines 82 may be formed from part way along a drain electrode 13, so as to connect to the signal line 3. In such case, the source and the drain of each of the TFT switches 4 are also shorted. When the source and drain of each of the TFT switches 4 are shorted, as in the above exemplary embodiments and as shown in FIG. 9, gate electrodes 2 may be formed so as to be separated from scan lines 101, as shown in FIG. 10.

Figure 11:
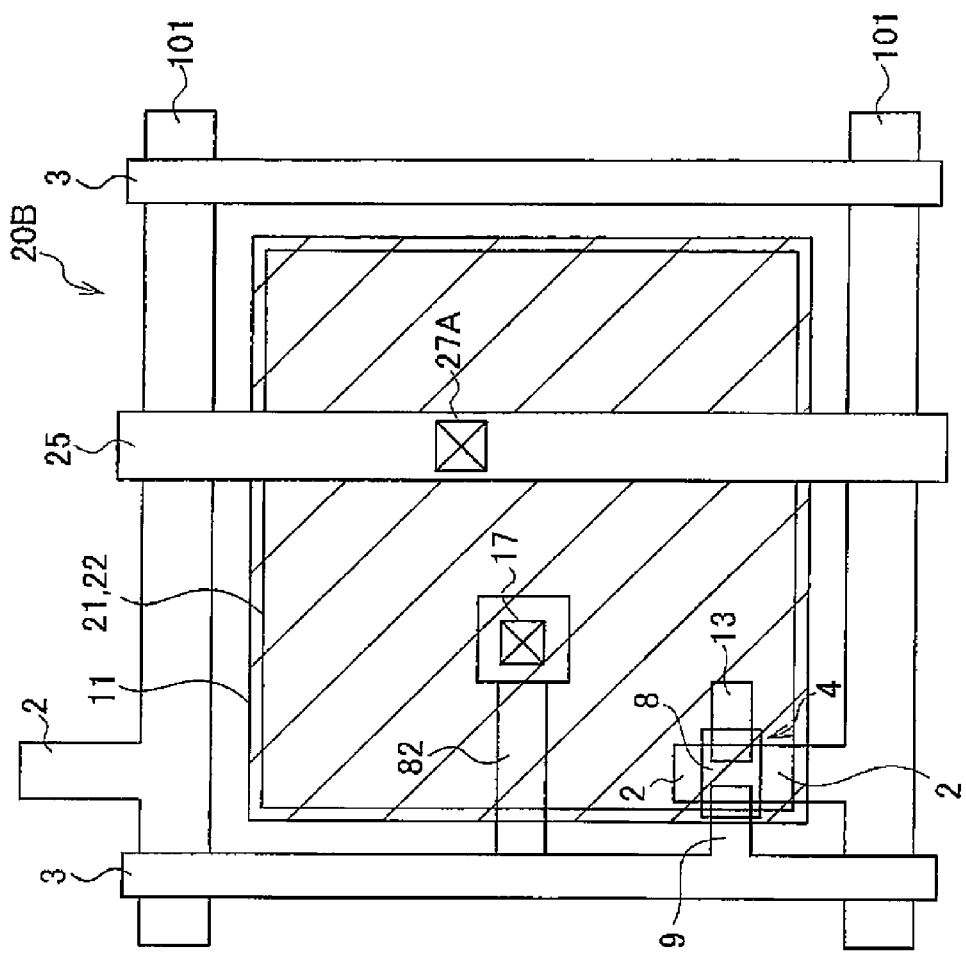
FIG. 11 is a plan view illustrating a configuration of a radiation detector according to an alternative exemplary embodiment.

Furthermore, as shown in FIG. 11, connection line 82 may be formed in each of the radiation detection pixels 20B, a sensor portion 103 and a signal line 3 may be connected through the connection line 82 and a contact hole 17, and the drain electrode 13 and the contact hole 17 may be electrically isolated from each other.

Note that there is no limitation in the present exemplary embodiment to performing disconnection detection for all of the signal lines 3, and configuration may be made such that disconnection detection is performed for at least the specific signal lines 3. Furthermore, whereas in the above present exemplary embodiments the gates of the TFT switches 4 are switched on sequentially one at a time for each of the signal lines 3 there is no limitation thereto. Control may be performed such that gates of the TFT switches 4 of plural of the pixels 20 are switched on at the same time.

The sampling period Ts for cumulating the offset charge amount Qo, namely the number of the offset charge amounts Qo to be cumulated, is not limited to the present exemplary embodiment. The sampling period Ts may be predetermined according to the specification of the radiographic imaging device 100 (the radiation detector 10).

In the radiation detector 10 (see FIG. 2) of the radiographic imaging device 100 of the present exemplary embodiment, the radiation detection pixels 20B are connected to some of the signal lines 3. However the present invention is not limited thereto. The radiation detection pixels 20B may be provided to be connected to all of the signal lines 3, and there are no particular limitations to the positions at which the radiation detection pixels 20B are provided.

The configurations and operation such as of the radiographic imaging device 100 and the radiation detector 10 explained in the present exemplary embodiment are merely examples. Various changes are possible according to circumstances within a scope not departing from the spirit of the present invention.

In the present exemplary embodiment, there is no particular limitation to the radiation of present invention employed, and radiation such as X-rays and gamma rays can be appropriately employed.

Figure 12:
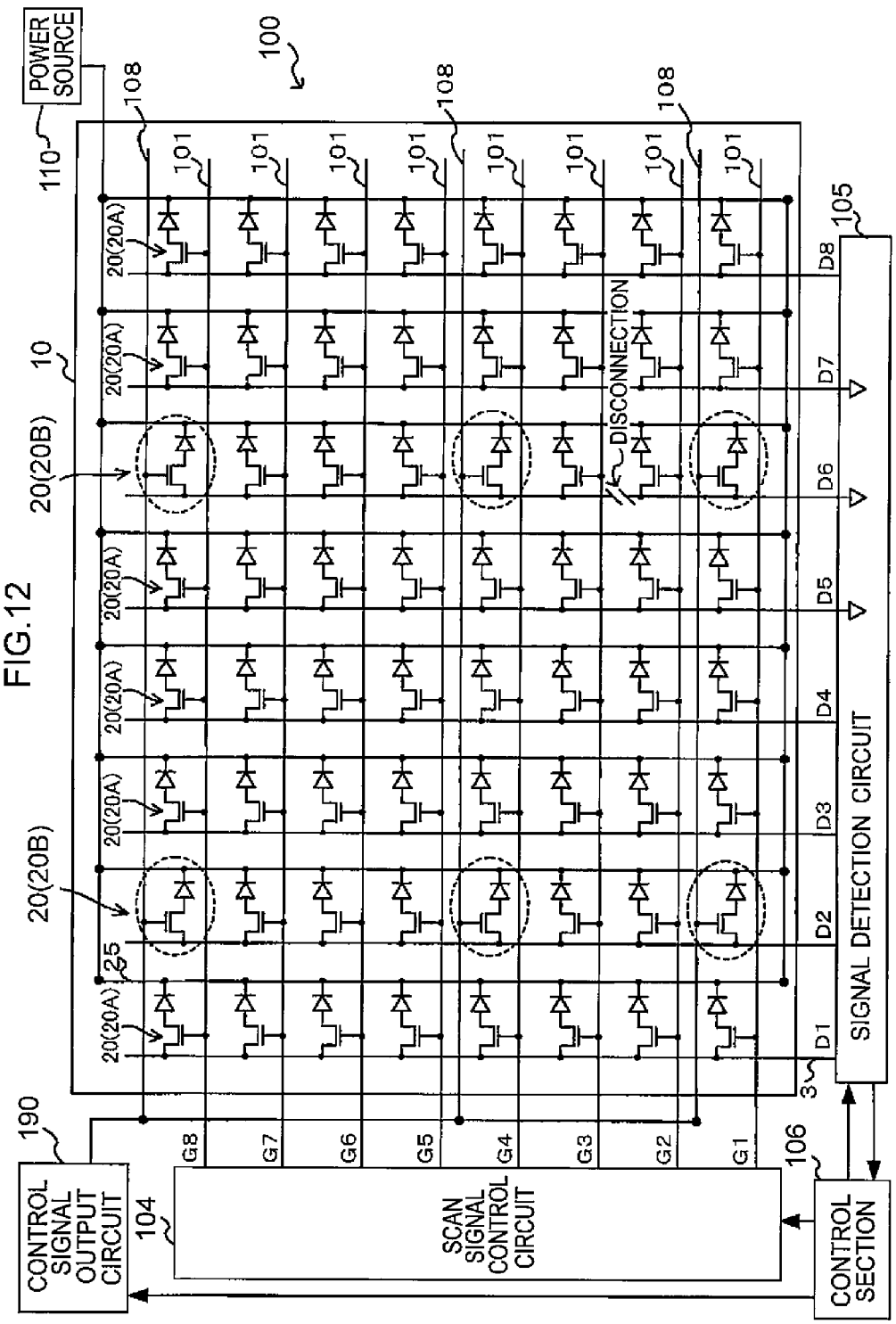
FIG. 12 is a diagram illustrating a configuration of a radiation detector according to an alternative exemplary embodiment.

In the present exemplary embodiment explanation, a case in which pixels with shorted TFT switches 4 are employed as the radiation detection pixels 20B, have been described. However, pixels that do not have shorted TFT switches 4 may also be employed as the radiation detection pixels 20B. An example of an overall configuration of such a radiographic imaging device is illustrated in FIG. 12. As shown in FIG. 12, the radiographic imaging device 100 includes specific scan lines 108 for controlling the pixels 20B. The specific scan lines 108 are provided separately to scan lines 101 and are running parallel to the scan lines 101. The TFT switches 4 of the pixels 20B are controlled by the control section 106 through a control signal output circuit 190 independent from control of the TFT switches 4 of the pixels 20A. Since configuration is similar to the above exemplary embodiment, except in that control of the TFT switches 4 is performed differently for the pixels 20A and the pixels 20B, disconnected signal lines 3 can be detected by comparing the cumulative value of the cumulated offset charge amount Qo of the pixels 20 connected to the signal lines 3 similarly to in the above exemplary embodiment. In the radiation detection having such configuration, the gates of the TFT switches 4 of the pixels 20A may be switched on sequentially by using only the scan lines 101, so as to output offset charges. Further, in the radiation detection having such configuration, the gates of the TFT switches 4 of the pixels 20B may be switched on sequentially by using the specific scan lines 108, so as to output offset charges. For such pixels 20B, specific pixels 20 of the radiation detector 10 may employed, or pixels that are different from the pixels 20 may be provided in the radiation detector 10.

What is claimed is:

1. A radiographic imaging device comprising:
    a plurality of radiation detection elements that output electric signals according to charges generated due to irradiation of radiation, wherein each of the radiation detection elements is a pixel in which a switching element is shorted;
    a plurality of radiographic imaging pixels, each including:
        a sensor portion that accumulates charges generated due to irradiation of the radiation, and
        a switching element that, based on an imaging control signal output from an imaging control signal line, reads out the charges from the sensor portion and outputs electric signals corresponding to the charges;
    a plurality of specific signal lines connected to the switching elements of the plurality of radiation detection elements and to the switching elements of the plurality of radiographic imaging pixels;
    a plurality of charge amount detection sections, each provided for one of the plurality of specific signal lines, which detect, corresponding to a number of the radiographic imaging pixels, a cumulative value of the charge amount accumulated in the sensor portions, based on electric signals that have been output from the plurality of the radiographic imaging pixels; and
    a disconnection detection section that detects disconnection in the specific signal lines based on a comparison result from comparing the cumulative value detected by the charge amount detection section with a predetermined value.

2. The radiographic imaging device of claim 1 further comprising a plurality of detection element control signal lines that output, to the radiation detection elements, a radiation detection control signal to control output of electric signals from the radiation detection elements.

3. The radiographic imaging device of claim 1 further comprising:
    a detection section that detects a start of irradiation of the radiation based on the electric signals output from the radiation detection elements; and
    a control section that controls the detection section to detect the start of irradiation of the radiation based on electric signals that have been output from the radiation detection elements to the specific signal lines that are not detected to be disconnected by the disconnection detection section.

4. The radiographic imaging device of claim 1 wherein the charge amount detection sections detect the cumulative value based on electric signals output corresponding to charges that have been accumulated in the sensor portions of the radiographic imaging pixels, in a case in which the radiation is not being irradiated.

5. The radiographic imaging device of claim 1 further comprising a storage section for storing a detection result of the disconnection detection section.

6. The radiographic imaging device of claim 1 further comprising a warning section that warns regarding the number of the specific signal lines that have been detected as disconnected by the disconnection detection section, warns that disconnections have reached a predetermined number or greater when the number of the specific signal lines that have been detected as disconnected by the disconnection detection section is the predetermined number of lines or greater, or a combination thereof.

7. A radiographic imaging system comprising:
    an irradiation device that irradiates radiation; and
    the radiographic imaging device of claim 1, which detects the radiation irradiated from the irradiation device and acquires a radiographic image according to the detected radiation.

8. A method for detecting a disconnection in a radiographic imaging device that includes:
    a plurality of radiation detection elements that output electric signals according to charges generated due to irradiation of radiation, wherein each of the radiation detection elements is a pixel in which a switching element is shorted,
    a plurality of radiographic imaging pixels, each including a sensor portion that accumulates charges generated due to irradiation of the radiation, and a switching element that, based on an imaging control signal output from an imaging control signal line, reads out the charges from the sensor portion and outputs electric signals corresponding to the charges, and
    a plurality of specific signal lines connected to the switching elements of the plurality of radiation detection elements and to the switching elements of the plurality of radiographic imaging pixels,
    the method comprising:
    detecting, corresponding to a number of the radiographic imaging pixels, a cumulative value of the charge amount accumulated in the sensor portions, based on electric signals that have been output from the plurality of the radiographic imaging pixels; and
    detecting disconnections in the specific signal lines based on a comparison result by comparing the detected cumulative value with a predetermined value.

9. A disconnection detection method for a radiographic imaging device including:
    a plurality of radiation detection elements that output electric signals according to charges generated due to irradiation of radiation, wherein each of the radiation detection elements is a pixel in which a switching element is shorted,
    a plurality of radiographic imaging pixels, each including a sensor portion that accumulates charges generated due to irradiation of the radiation, and a switching element that, based on an imaging control signal output from an imaging control signal line, reads out the charges from the sensor portion and outputs electric signals corresponding to the charges, and
    a plurality of specific signal lines connected to the switching elements of the plurality of radiation detection elements and to the switching elements of the plurality of radiographic imaging pixels,
    the method comprising:
    performing a charge amount detection process that detects, corresponding to a number of the radiographic imaging pixels, a cumulative value of the charge amount accumulated in the sensor portions, based on electric signals that have been output from the plurality of the radiographic imaging pixels; and
    performing a disconnection detection process that detects disconnection in the specific signal lines based on a comparison result by comparing the cumulative value detected in the charge amount detection process with a predetermined value.

* * * * *